G. J. WOODRUFF.
GARDEN SPRINKLER.
APPLICATION FILED OCT. 30, 1916.

1,334,341.

Patented Mar. 23, 1920.

Witnesses

Inventor
G. J. Woodruff,
By
Attorneys

UNITED STATES PATENT OFFICE.

GLENN J. WOODRUFF, OF MACHIAS, NEW YORK.

GARDEN-SPRINKLER.

1,334,341.  Specification of Letters Patent.  Patented Mar. 23, 1920.

Application filed October 30, 1916. Serial No. 128,542.

*To all whom it may concern:*

Be it known that I, GLENN J. WOODRUFF, a citizen of the United States, residing at Machias, in the county of Cattaraugus, State of New York, have invented certain new and useful Improvements in Garden-Sprinklers; and I do hereby declare the following to be a full, clear, and exact description of the invention, such as will enable others skilled in the art to which it appertains to make and use the same.

This invention relates to new and useful improvements in sprinklers, particularly of that type including a rotary nozzle member, wherein the rotary movement is imparted by the current of water.

It is the object of the present invention to provide such a sprinkling apparatus which is relatively simple in structure, and which will operate to rotate the nozzle with a minimum expenditure of water for such purpose.

With the above and other objects and advantages in view, the invention resides more particularly in the combination, formation and arrangement of parts as more fully described hereinafter and pointed out in the appended claims.

Reference is had to the accompanying drawings, wherein similar characters of reference designate corresponding parts throughout the several views, and in which.

Figure 1:
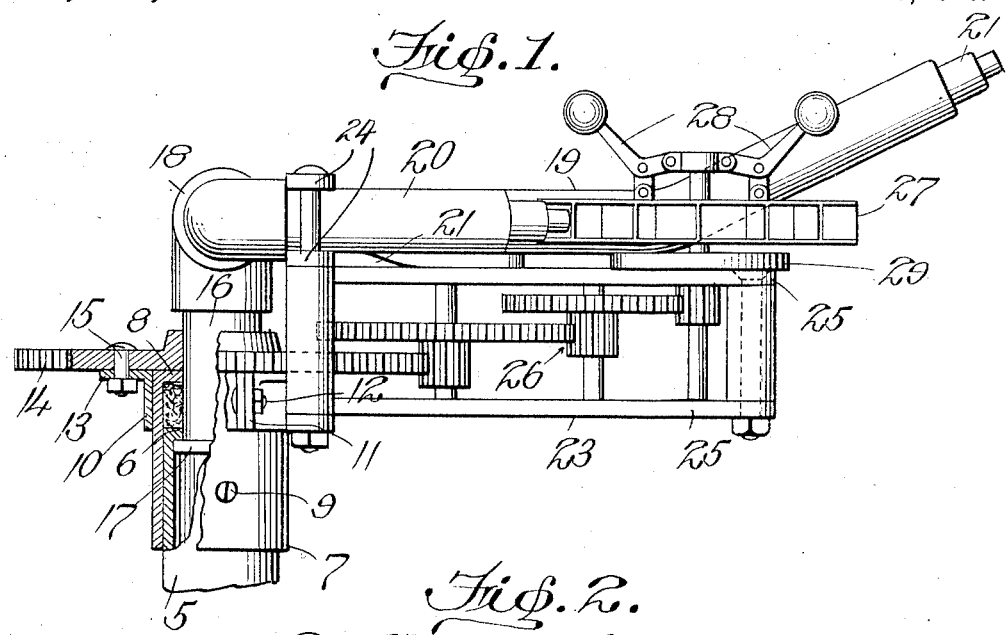
Figure 1 is a side elevation of the improved sprinkling apparatus.
Figure 2:
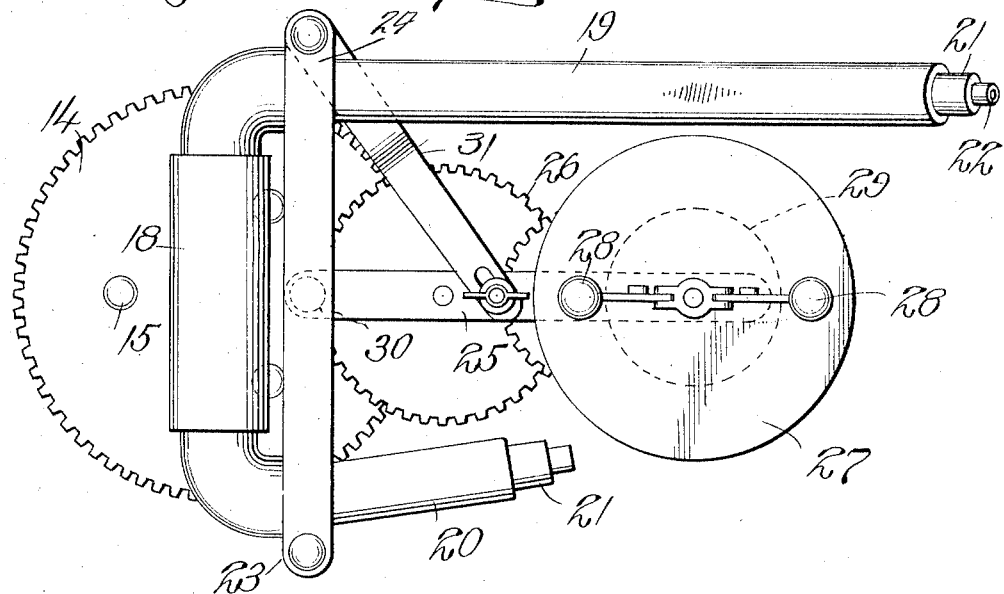
Fig. 2 is a top plan view.
Figure 3:
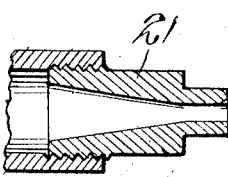
Fig. 3 is a detail sectional view of one of the nozzle members.

Referring now more particularly to the accompanying drawing, the improved apparatus comprises a pipe or conduit 5 provided at its upper end with an inwardly directed flange 6, and fitted over the pipe is a sleeve 7 also provided at its upper end with an inwardly directed flange 8 disposed in spaced relation to the flange 6.

The sleeve 7 is held in fixed relation to the pipe 5 by means of a set screw 9 and has encircling its upper end a split ring 10 provided with radially extending apertured ears 11 through which is passed a clamping bolt 12. The ring 10 is further provided at spaced intervals in its circumference with radial projections 13 upon which a gear 14 is supported and secured in fixed relation through the medium of bolts 15.

Swivelly mounted within the pipe 5, sleeve 7 and gear 14 is a vertical conducting pipe 16 the lower end of which is outwardly flanged as at 17 to engage beneath the flange 6 so that displacement of the pipe 16 will be prevented.

Engaged upon the upper end of the conducting pipe 16 is a T-coupling 18 with the arms of which horizontal delivery pipes 19 and 20 are respectively connected, the pipe 19 being of greater length than the pipe 20 and terminally inclined upwardly as shown, while the pipe 20 is slightly inclined inwardly for a purpose to appear. A nozzle 21 is threaded in the end of each of the pipes 19 and 20 and is provided with a constricted bore 22 through which the water is discharged.

For rotating the pipes 19 and 20 upon their swivel mounting there is provided a gear frame 23 including a plurality of transverse bars 24 rigidly supported from the pipes adjacent the T-coupling 18 and a pair of spaced longitudinally extending bars 25 between which is mounted a reducing train of gears 26. The inner of the gears 26 is constantly in mesh with the fixed gear 14 while the outermost gear carrying shaft is extended above the upper bar 25 and has slidably keyed thereon a paddle wheel 27 so disposed as to receive the full force of the water discharged through the pipe 20. There is further carried by this outer gear shaft and pivoted to the paddle wheel, a pair of governor arms 28 operable with the paddle wheel and adapted to move the latter, should it attain an excessive speed, into frictional contact with a disk 29 fixed to the upper frame bar 25, the latter serving as a brake to reduce the speed of the wheel as is obvious.

It is of course understood that this movement of the paddle wheel is transmitted to the train of gears 26 which by reason of their meshing with the fixed gear 14 will revolve the frame 23 and the pipes 19 and 20, the water from the pipe 19 being discharged in a relatively large circle, while the water from the pipe 20 will be broken by the paddle wheel and projected in a spray within said circle.

It will be noted that the bars 25 of the gear frame 23 are pivotally mounted at their inner ends upon a bolt 30 passed through the transverse bars 24, so that they may be swung horizontally to move the paddle wheel toward and away from the pipe 20, the water discharged through the latter being thus caused to impinge upon a greater or less area of the paddle wheel whereby to increase or reduce its speed as is obvious. A bar 31 pivotally connected at one end with the transverse bars 24 and having slotted connection with the bars 25, is employed to hold the latter in adjusted position.

What I claim is:—

1. In a sprinkling apparatus, the combination with a feed pipe, and a second pipe swiveled thereon and branched into two delivery pipes having nozzles; of bars fixed across said delivery pipes, a frame pivoted to said bars, a paddle wheel mounted in said frame, means whereby rotation of the wheel causes the revolution of said frame and nozzles around the feed pipe, and a brace adjustably connecting said bars and frame for holding the latter fixed in various positions whereby the paddle wheel receives more or less water from one of said nozzles.

2. In a sprinkling apparatus, the combination with a feed pipe, a fixed gear thereon, and a second pipe swiveled in the first and branched into two delivery pipes having nozzles; of bars fixed across said delivery pipes, a frame pivoted to said cross bars, a paddle wheel mounted in said frame, a train of gearing connecting the wheel with the fixed gear, and means for holding the frame fixed in adjusted positions whereby the paddle wheel receives more or less water from one of said nozzles.

In testimony whereof, I affix my signature, in the presence of two witnesses.

GLENN J. WOODRUFF.

Witnesses:
 H. M. DARBEE,
 V. S. LEWIS.